(12) United States Patent
Przybylski et al.

(10) Patent No.: US 6,484,310 B1
(45) Date of Patent: Nov. 19, 2002

(54) PATTERNS FOR MODELING COMPUTER COMPONENT INTERACTIONS

(75) Inventors: Piotr Przybylski, Toronto (CA); Michael Beisiegel, Toronto (CA); Sascha Baumeister, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/393,979

(22) Filed: Sep. 10, 1999

(30) Foreign Application Priority Data

Sep. 24, 1998 (CA) .................................. 2248404

(51) Int. Cl.[7] .............................................. G06F 9/44
(52) U.S. Cl. .................... 717/101; 717/102; 717/103; 717/108; 717/169; 717/170; 717/171; 717/175; 717/176; 709/227; 709/228; 709/229
(58) Field of Search ................................. 717/101, 102, 717/103, 108, 110, 116, 176, 177, 169, 170, 171, 175; 709/227, 228, 229

(56) References Cited

U.S. PATENT DOCUMENTS

| | | | | | |
|---|---|---|---|---|---|
| 5,805,804 | A | * | 9/1998 | Laursen et al. | 370/397 |
| 6,038,562 | A | * | 3/2000 | Anjur et al. | 707/10 |
| 6,044,218 | A | * | 3/2000 | Faustini | 709/315 |
| 6,119,126 | A | * | 9/2000 | Yee et al. | 707/10 |
| 6,158,044 | A | * | 12/2000 | Tibbetts | 707/1 |
| 6,179,489 | B1 | * | 1/2001 | So et al. | 709/102 |
| 6,233,543 | B1 | * | 5/2001 | Butts et al. | 703/27 |

FOREIGN PATENT DOCUMENTS

EP     0 647 047 A2 *  4/1995  ........... H04L/29/06

OTHER PUBLICATIONS

Unger et al., "Design for Integration of a DBMS Into a Network Environment", IEEE, Pp. 26–34, 1979.*

Noro et al., "An Architecture And a Framework For IP Applications", IEEE, pp. 191–199, 1997.*

Java Database Connectivity by Bernard Van Haecke Jun. 10, 1998; pp. 19–28/37–39/47–66/120–124.

* cited by examiner

Primary Examiner—Tuan Q. Dam
Assistant Examiner—Ted T. Vo
(74) Attorney, Agent, or Firm—Louis P. Herzberg

(57) ABSTRACT

A computer system and method including commands to permit interaction between a client and a component in a backend system. The command has an input object, for transformation by the backend system, and defines one or more output objects, representing the input object after transformation by the backend system. The command includes a connection specification, for identification of the backend system with which the client is to interact, and an interaction specification, for identification of the component in the backend system with which the client is to interact. The command also includes a communication object, for carrying out a connection between the client and the component of the backend system. The input object is supplied to the component of the backend system in accordance with the interaction specification and the connection specification. The command is driven by an execute method and the command signals a successfully or an unsuccessful event depending on exceptions being encountered by the component of the backend system in processing the input object. Navigators are built for constructing an interaction flow. Navigators contain chained commands and other navigators.

11 Claims, 4 Drawing Sheets

PATTERNS FOR MODELING COMPUTER COMPONENT INTERACTIONS

RELATED APPLICATION

U.S. patent application, Ser. No. 09/393,470 filed on even date herewith and entitled "Common Connector Framework", the contents of which application is hereby incorporated by reference.

FIELD OF THE INVENTION

The present invention is directed to an improvement in computing systems and in particular to patterns for modeling interactions between computer systems or components.

BACKGROUND OF THE INVENTION

There are many different computer systems known as application systems. Examples include database management or transaction processing systems. Such systems are sometimes referred to as "backend" systems because certain users do not access the systems directly, but rather through a particular "frontend" or user interface, which in turn communicates with the application system to carry out the function requested by the user. Backend systems typically provide access to the functions of the backend system by a communication interface which allows remote and distributed use of the backend system.

Since backend systems have been developed by different companies or groups, they provide different access methods, for example, different sets of APIs to use their services. This causes a serious problem for the application developer who is forced to learn to use different APIs to support various backend systems or even various communications methods with the same system Moreover, it is very hard to provide general tooling or any type of automation of such access, for example code generation requires customized tools that are not reusable and cannot support multiple targets. As well, such tools require specific runtime support that also cannot be reused. This problem is especially annoying since abstraction of the access to the functionality of various backend systems is very similar.

It is therefore desirable to have a standard set of high level interfaces, to which such systems would adhere to permit the modeling of these interactions between computer systems or components in a generic pattern.

SUMMARY OF THE INVENTION

According to one aspect of the present invention, there is provided an improved computer system and method.

According to another aspect of the present invention, there is provided an improved computer system and method for interacting or communicating between a client and a component in a backend system.

According to another aspect of the present invention, there is provided a computer system comprising a command for interacting between a client and a component in a backend system, the command comprising an input object, for transformation by the backend system, one or more output objects, representing the input object after transformation by the backend system, a connection specification, for identification of the backend system with which the client is to interact, an interaction specification, for identification of the component in the backend system with which the client is to interact, and a communication object, for carrying out a connection between the client and the component of the backend system wherein the input object is supplied to the component of the backend system in accordance with the interaction specification and the connection specification and wherein the one or more output objects receive the transformed input object after processing by the component of the backend system, wherein the command is driven by an execute method and wherein the command signals a successful event on no exception being encountered by the component of the backend system in processing the input object, and wherein the command signals an unsuccessful event on an exception being encountered by the component of the backend system in processing the input object.

According to another aspect of the present invention, there is provided the above computer system in which the command is an object oriented class.

According to another aspect of the present invention, there is provided the above computer system in which the input object and the one or more output objects are each a record bean in a defined Java framework.

According to another aspect of the present invention, there is provided a computer system comprising a navigator for forming an interaction flow with a backend system, the navigator comprising a set selectively comprising subcommands and subnavigators, wherein the execute method for each of the subcommands and subnavigators in the set is triggered by a one of an internal event in the navigator derived from the execute method for the navigator, or a successful event from another selected one of the set of subcommands and subnavigators whereby the successive execution of the subcommands and subnavigators in the set defines an interaction flow with the backend system, wherein the navigator is driven by an execute method and wherein the navigator signals a successful event on no unsuccessful event being signalled by the successive execution of the subcommands and subnavigators in the set, and wherein the navigator signals an unsuccessful event on an unsuccessful event being signalled by any one of the successive executions of the subcommands and subnavigators in the set, and wherein subcommands have characteristics identical to commands, and wherein subnavigators have characteristics identical to navigators.

According to another aspect of the present invention, there is provided an object oriented computer environment comprising a command class for interacting between a client and components in backend systems, the command class comprising an input object, for transformation by a selected one of the backend systems, one or more output objects, representing the input object after transformation by the selected one of the backend systems, a connection specification, for identification of the selected one of the backend systems with which the client is to interact, an interaction specification, for identification of a selected one of the components in the selected one of the backend systems with which the client is to interact, and a communication object, for carrying out a connection between the client and the selected one of the components of the selected one of the backend systems wherein the input object is supplied to the selected one of the components of the selected one of the backend systems in accordance with the interaction specification and the connection specification and wherein the one or more output objects receive the transformed input object after processing by the selected one of the components of the selected ones of the backend systems, wherein the instance of the command signals a successful event on no exception being encountered by the selected one of the components of the selected one of the backend systems in processing the input object, and wherein the command signals an unsuccessful event on an exception being encountered by the selected one of the components of the selected one of the backend systems in processing the input object.

According to another aspect of the present invention, there is provided the above object oriented computer environment in which the environment is the Java programming language environment and in which the input object and the one or more output objects are each a record bean in a defined Jave framework, and in which navigators, as described above are defined as a class.

Advantages of the present invention include the provision of a solution to the problem by providing a generic runtime that supports interactions with different backend systems using different communications.

Media encoded with program code to effect the above-described systems or processes is also provided in the invention.

BRIEF DESCRIPTION OF THE DRAWINGS

The preferred embodiment of the invention is shown in the drawings, wherein.

Figure 1:
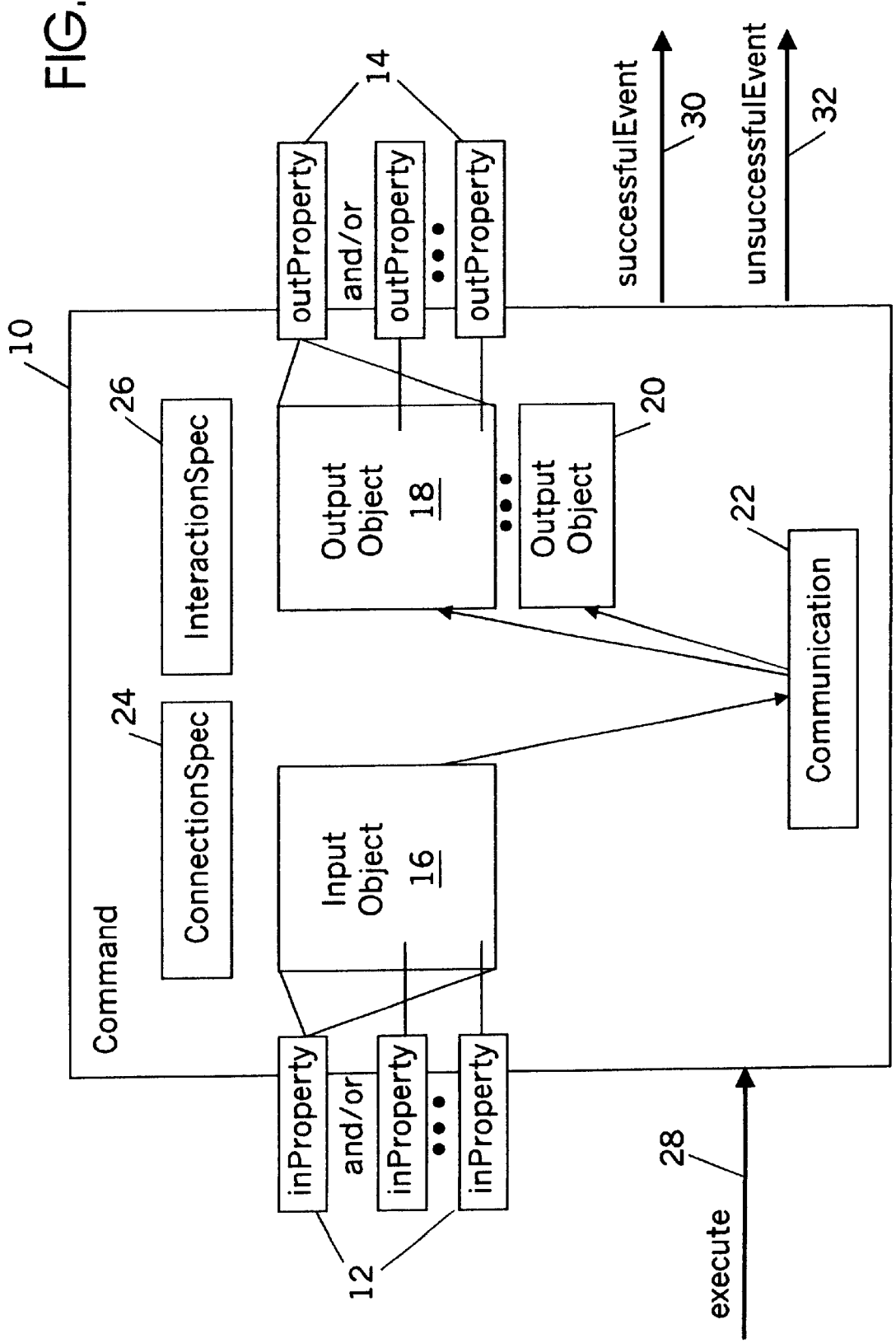
FIG. 1 is a block diagram showing the architecture of a Command in accordance with the preferred embodiment of the invention

In the drawings, the preferred embodiment of the invention is illustrated by way of example. It is to be expressly understood that the description and drawings are only for the purpose of illustration and as an aid to understanding and are not intended as a definition of the limits of the invention.

DETAILED DESCRIPTION OF THE PREFERRED EMBODIMENT

Referring to FIG. 1, there is illustrated in a block diagram the structure of a Command in accordance with the preferred embodiment. In the preferred embodiment the Command is a class as defined in object oriented programming languages. The preferred embodiment is described with reference to the Jave programming language. It is understood by those skilled in the art that other programming languages which support object oriented constructs may be used to implement the preferred embodiment of the invention.

Command 10 in FIG. 1 is a class used to access a backend system. Command 10 has input properties shown in boxes 12 (the set of InProperty boxes), and output properties shown in boxes 14. Input properties 12 are contained in Input Object 16 and similarly, output properties 14 are contained in Output Object 18, or optionally, in additional Output Objects, represented in FIG. 1 by Output Object 20. Command 10 includes the object Communication 22. Objects ConnectionSpec 24 and Interaction Spec 26 are also included in Command 10. Command 10 is driven by method execute 28, and signals successfulEvent 20 or unsuccessful Event 32, depending on whether execution of the method execute 28 creates an exception (signals unsuccessfulEvent 32) or not (signals successfulEvent 34).

As shown in FIG. 1, the elements involved in the communication with the backend system are: a connection specification (shown in FIG. 1 as ConnectionSpec 24), interaction specification (shown in FIG. 1 as InteractionSpec 26), input and output record beans (shown in FIG. 1 as Input Object 16 and Output Objects 18, 20). In any such Command 10 of the preferred embodiment these elements are always present and implement the same logic: the input is transformed into output by communication. In the manner, the Command logic can be reused for any backend system The preferred embodiment describes the implementation of the runtime that supports interactions with different backend systems. The runtgime of the preferred embodiment provide a generic method of modeling interactions yet is flexible enough to accommodate different requirements of the target systems and their communications. This in turn allows building the advanced tools to automate the construction of such interactions. Since the preferred embodiment provides a uniform way to access different backends, the applications and tools using the generic pattern of the preferred embodiment can easily be reused.

Command 10 is the basic building block used to construct a single communication (or interaction) with a backend system. In other words, Command 10 wraps a single interaction with a system On execution, it takes its input data, sends the data via a connector (the object communication 22 in FIG. 1) to a backend system, and sets the data returned by the backend system as its output. At this level of description, Command 10 shares functionally with procedure or subroutine calls in many computer languages.

Command 10, however, is itself a composite following a, specific construction pattern It is this construction pattern which makes Command 10 of value in permitting communication with backend systems.

The input of Command 10 is defined by Input Object 16. One example of such an Input Object 16 is a Java bean. A bean is a Java language construct which is equivalent to a class but which is able to be edited with a visual editor. The output of Command 10 is Output Object 18. For the output, the possibility exists that there may be multiple Output Objects defined as candidates (Output 18, 20 in the example of FIG. 1). Again, Java beans may be used as Output Objects. A Command can show an entire object in its interface, or just selected object properties, as illustrated by properties 12, 14.

Input and Output Objects may have different forms. In the preferred embodiment, it is possible to distinguish two types of Input and Output Objects. The first type of Input or Output Object is a RecordJava record bean. This type of bean implements the IByteBuffer interface, which is part of a defined Jave framework. The second type of Input or Output Object, is one which is defined with properties specific to the connector for the backend system (in FIG. 1, communication 22). Connectors themselves may therefore be considered to fall into one of three categories: those that support the RecordJave record bean, those that support both connector-specific Input and Output Objects and RecordJava record beans, and those that support only connector-specific Input and Output Objects.

How Command 10 communicates with a backend system is defined by the ConnectionSpec 24 and the InteractionSpec26. ConnectionSpec24 is the factory of the concrete connector communication 10.

The properties of ConnectionSpec 24 define the backend system to which the connector is connecting (for example, hostname and portnumber may be properties of ConnectionSpec 24). ConnectionSpec 24 may be thought of as an object that defines the session relating to communication between systems. The other object which defines the communication is InteractionSpec26. This object carries all interaction relevant properties (for example, the name of the program called via communication 22, may be a property InteractionSpec 26). InteractionSpec 24 may be thought of as an object that defines a particular interaction in a session.

The method driving the Commands execution is execute (shown as arrow 28 in FIG. 1). This method includes the following steps:

1. takes ConnectionSpec 24, actors a communication from it,
2. connects communication 10 to the backend system,
3. sends the data of Input Object 16 through communication 22,
4. receives the data for Output Object 18 (or optionally other Output Objects, represented by Output Object 20),
5. if no exception occurred signals an executionSuccessful event (arrow 30 in FIG. 1), otherwise an executionUnsuccessful event (arrow 32). An exception that is not handled by the receiver of the executionUnsuccessful event is rethrown, and by that catchable by the client of the execute method.

As will be appreciated, Command 10 may be used to create interactions with different backend systems. The complexity of Communication 22 is therefore variable and is capable of ranging from having virtually no complexity to having great complexity, depending on the backend system being interacted with. Communication 22 can be a simple Java class or may be an RPC or a communication interface from an IBM Common Connector Framework.

Figure 2:
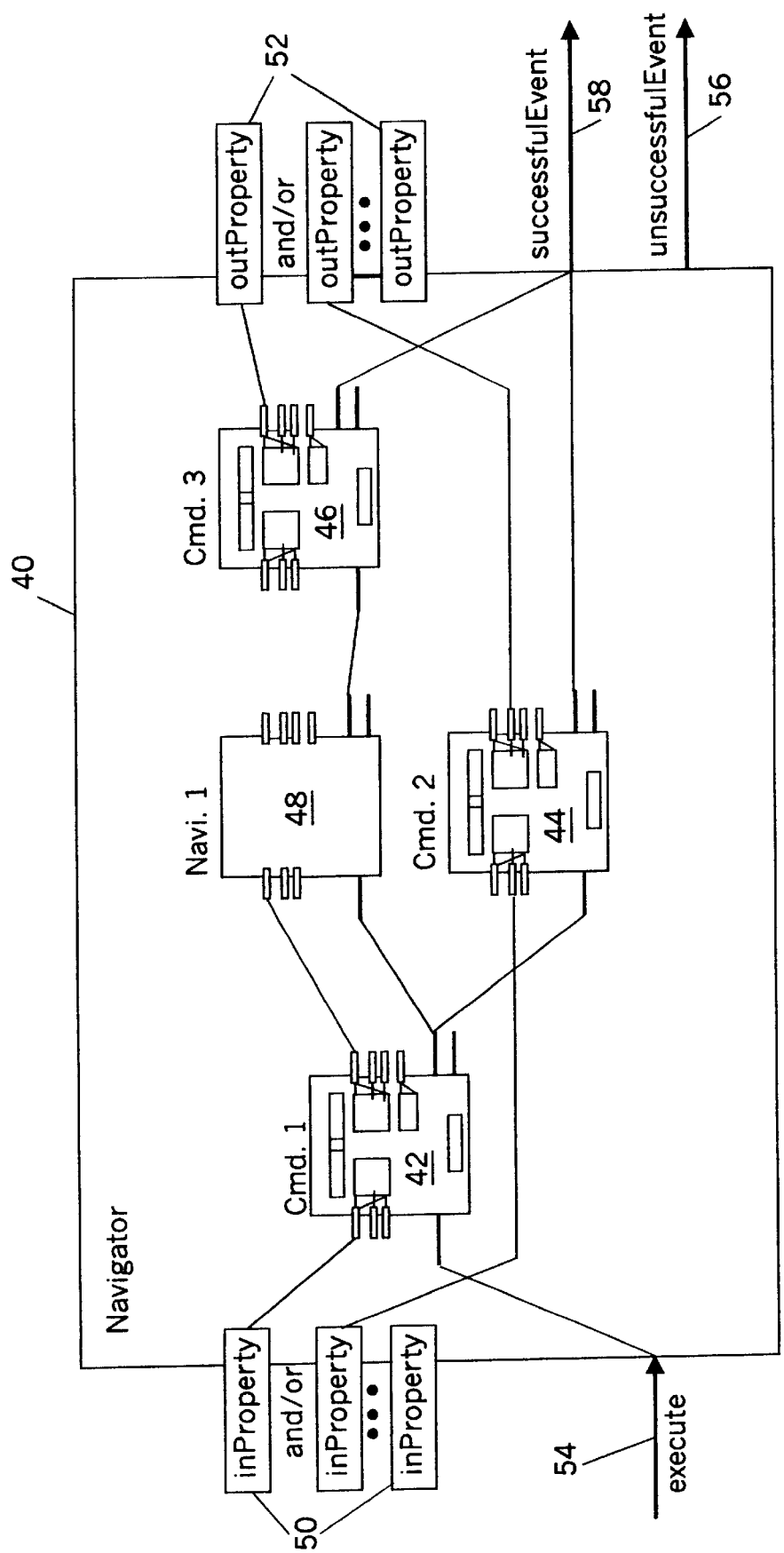
FIG. 2 is a block diagram showing the architecture of a navigator in accordance witgh the preferred embodiment of the invention.

As described above, Command 10 wraps a single interaction with a backend system According to the preferred embodiment, another class, known as Navigator, is provided. A Navigator wraps multiple interactions with a backend system FIG. 2 is a block diagram illustrating the structure of Navigator 40. Navigator 40 is a composed Command. Navigator 40 interfaces with outside objects in a manner similar to a Command. The Navigator 40 composition consists of Commands and possibly Navigators forming an interaction flow with a backend system.

In FIG. 2, Navigator 40 is shown having the Commands Cmd.1 42, Cmd.2 44, Cmd.3 46 and Navi.1 48.

On execution, Navigator 40 takes its input (InProperties 50) and provides it to the Commands and Navigators it is composed of Interactions are then carried out in sequence as shown by the flow lines in FIG. 2. After the final interaction, output of the individual Commands 42, 44 and 46 and Navigator 48 is available as the output of the Navigator (OutProperties 52). As FIG. 2 illustrates, the execute method for Cmd. 1 42 is initiated by the Navigator 40 execute event (arrow 54). Cmd.2 44 has its execute method initiated by the successfulEvent event from Cmd. 1 42, and so forth for other Commands and the Navigator in Navigator 40.

How Navigator 40 communicates with a backend system can be defined optionally by a connection specification on its level instead of defining it for each Command in the composition. A connection specification is the factory of the concrete connector communication a Navigator is using (the communication used by all Commands in the composition).

Navigator 40 reaches an unsuccessful execution state in case of an exception in one of the Commands 42, 44 or 46 or Navigator 48. Navigator 40 shows this by signalling the executionUnsuccessful event (arrow 56). An exception that is not handled by the receiver of the executionUnsuccessful event is rethrown, and by that catchable by the client of the execute method.

As the above indicates, the Command class defines a runtime that permits interaction with a backend system in a clear and well-defined manner. The Command class may be used to create Navigator classes which permit an interaction flow with a backend system, or system, to be defined.

The above Command and Navigator classes lend themselves to visual programming system. For this reason, the use of Java beans (classes which are designed for visual programming) is advantageous in creating the classes of the preferred embodiment. As may be seen from FIG. 2, a visual programming environment is able to render the relationships between the objects of the preferred embodiment in a manner which makes programming with the Command and Navigator classes relatively simple and efficient.

Figure 3:
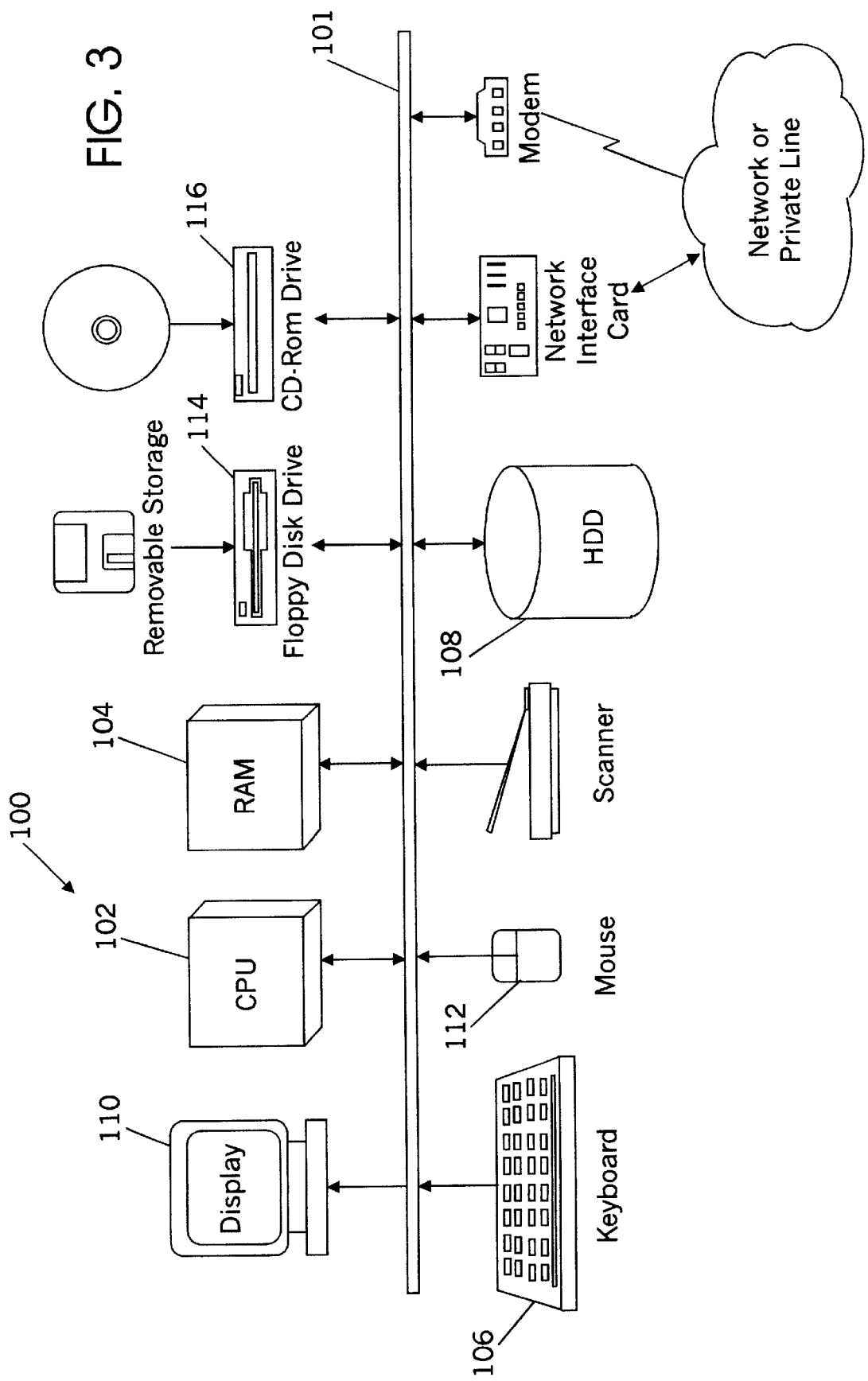
FIG. 3 is a block diagram of a computer system for use with the present invention.
Figure 4:
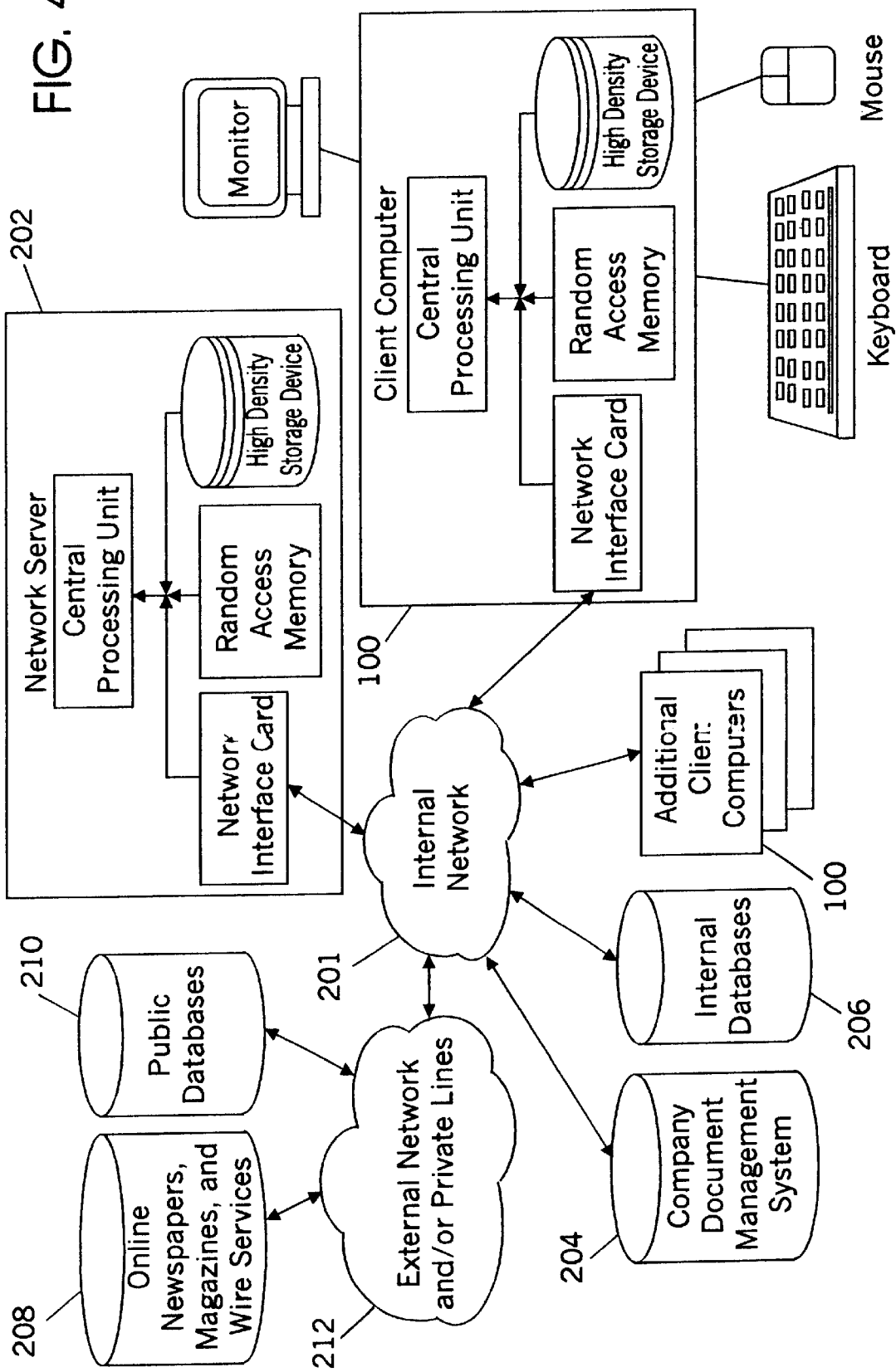
FIG. 4 is a block diagram of a computer network including computer systems such as the one shown in FIG. 3.

The present invention can be used on any properly configured general purpose computer system, such as the one shown in FIG. 3. Such a computer system 100 includes a processing unit (CPU) 102 connected by a bus 101 to a random access memory 104, a high density storage device 108, a keyboard 106, a display 110 and a mouse 112. In addition, there is a floppy disk drive 114 and a CD-ROM drive 116 for entry of data and software including software of the present invention into the system on removable storage. An example of such a computer is an IBM Personal Computer of the International Business Machines Corporation, such as an Aptive personal computer operating on Microsoft Windows 98 operating system of the Microsoft corporation. Also in this example there is an internet browser capable at running Java such as Netscape Navigator, e.g., Netscape Communications Corporation, Internet Explorer, e.g., Microsoft Corporation.

As shown in FIG. 2, computer 100, such s the one described in FIG. 1, are connected in an internal network 200 with a server 202 so that the computers 100 can obtain information stored in the server 202 or from other internal sources. Examples of internal sources are company document management systems 204, or internal databases 206. External sources, such as on-line newspapers, magazines and wire services 208 and public databases 210, are accessible through external networks 212 (such as the internet or a source private line).

Although a preferred embodiment of the present invention has been described here in detail it will be appreciated by those skilled in the art, that variations may be made thereto, without departing from the spirit of the invention or the scope of the appended claims.

We claim:

1. A computer system containing software comprising a plurality of commands for interacting between a client and a component in a backend system, code for each command comprising:

an input object, for transformation by the backend system, one or more output objects, representing the input object after transformation by the backend system, a connection specification object, for identification of the backend system with which the client is to interact, an interaction specification object, for identification of the component in the backend system with which the client is to interact, and a communication object, for carrying out a connection between the client and the component of the backend system wherein the input object is supplied to the component of the backend system in accordance with the interaction specification and the connection specification and wherein the one or more objects receive the transformed input object after processing by the component of the backend system, wherein the command is driven by an execute method and wherein the command signals a successful event on no exception being encountered by the component of the backend system in processing the input object, and wherein the command signals an unsuccessful event on an exception being encountered by the component of the backend system in processing the input object.

2. The computer system of claim 1 in which each command is an object oriented class.

3. The computer system of claim 2 in which the input object and the one or more output objects of each command are each a record bean in a defined Java framework.

4. The computer system of claim 1 including software for a navigator for forming an interaction flow with the backend system, code for the navigator comprising:

a set of subcommands and subnavigators, wherein the execute method for each of the subcommands and subnavigators in the set is triggered by a one of:
  an internal event in the navigator derived from the execute method for the navigator, or
  a successful event from another selected one of the set of subcommands and subnavigators whereby the successive execution of the subcommands and subnavigators in the set defines an interaction flow with the backend system, wherein the navigator is driven by an execute method and wherein the navigator signals a successful event on no unsuccessfuly event being signalled by the successive execution of the subcommands and subnavigators in the set, and wherein the navigator signals an unsuccessful event on an unsuccessful event being signalled by one one of the successive executions of the subcommands and subnavigators in the set, and wherein subcommands have characteristics identical to commands, and wherein subnavigators have characteristics identical to navigators.

5. A program product, on a computer usable medium, for an object oriented computer environment, containing software for a plurality of command classes for interacting between a client and components in backend system, code for each command class comprising:

an input object, for transformation by a selected one of the backend system, one or more output objects, representing the input object after transformation by the selected one of the backend systems, a connection specification object, for identification f the selected one of the backend systems with which the client is to interact, an interaction specification object, for identification of a selected one of the components in the selected one of the backend system with which the client is to interact, and a communication object, for carrying out a connection between the client and the selected one of the components of the selected one of the backend systems wherein the input object is supplied to the selected one of the components of the selected one of the backends systems in accordance with the interaction specification and the connection specification and wherein the one or more output objects receive the transformed input object after processing by the selected one of the components of the selected ones of the backend systems, wherein an instance of the command class is driven by an execute method called by the client, and wherein the instance of the command signals a successful event on no exception being encountered by the selected one of the components of the selected one of the backend systems in processing the input object, and wherein the command signals an unsuccessful event on an exception being encountered by the selected one of the components of the selected one of the backend systems in processing the input object.

6. The program product of claim 5 in which the environment is the Java programming language environment and in which the input object for each command class and the one or more output objects for each are each a command class record bean in a defined Java framework.

7. The software product of claim 5 including software for a navigator class for forming an interaction flow with backend systems, code for the navigator comprising:

a set of subcommands and subnavigators, wherein the execute event for each of the subcommands and subnavigators in the set is triggered by a one of
  an internal event in the navigator derived from the execute method for the navigator, or
  a successful event from another selected one of the set of subcommands and subnavigators whereby the successive execution of the subcommands and subnavigators in the set defines an interaction flow with one or more of the backend systems, wherein the navigator is driven by an execute method and wherein the navigator signals a successful event on no unsuccessful event being signalled by the successive execution of the subcommands and subnavigators in the set, and wherein the navigator signals an unsuccessful event on an unsuccessful event being signalled by any one of the successive executions of the subcommands and subnavigators in the set, and wherein subcommands have characteristics identical to commands, and wherein subnavigators have characteristics identical to navigators.

8. A computer system software for a navigator for forming an interaction flow between a client and a component in a backend system, code for the navigator comprising:

a set of subcommands each subcommand having an execute method and including an input object, for transformation by the backend system, one or more output objects, representing the input object after transformation by the backend systems, a connection specification, for identification of the backend system with which the client is to interact, an interaction specification, for identification of the component in the backend system with which the client is to interact, and a communication object, for carrying out a connection between the client and the component of the backend system wherein the input object is supplied to the component of the backend system in accordance with the interaction specification and the connection specification and wherein the one or more objects receive the transformed input object after processing by the component of the backend system, wherein the command is driven by an execute method and wherein the command signals a successful event on no exception being encountered by the component of the backend system in processing the input object, and wherein the command signals an unsuccessful event on an exception being encountered by the component of the backend system in processing the input object and at least one subnavigator having an execute method, wherein the execute method foe each of the subcommands and subnavigator in the set is triggered by a one of:
an internal event in the navigator derived from the execute method for the navigator, or
a successful event from another selected one of the set of subcommands and subnavigators
whereby the successive execution of the subcommands and subnavigators in the set defines an interaction flow with the backend system,
wherein the navigator is driven by an execute method and wherein the navigator signals a successful event on no unsuccessful event being signalled by the successive execution of the subcommands and subnavigators in the set, and wherein the navigator signals an unsuccessful event on an unsuccessful event being signalled by one of the successive executions of the subcommands and subnavigators in the set,
and wherein subcommands have characteristics identical to commands, and wherein subnavigators have characteristics identical to navigators.

9. The computer system of claim 8 in which the environment is the Java programming language environment and in which the input object and the one or more output objects are each a record bean in a defined Java framework.

10. A computer program product including software for a navigator class for forming an interaction flow between a client and components in backend systems, code for the navigator comprising:
a set of subcommands each subcommand having an execute method and including an input object, for transformation by a selected one of the backend system, one or more output objects, representing the input object after transformation by the selected one of the backend systems, a connection specification object, for identification f the selected one of the backend systems with which the client is to interact, an interaction specification object, for identification of a selected one of the components in the selected one of the backend system with which the client is to interact, and a communication object, for carrying out a connection between the client and the selected one of the components of the-selected one of the backend systems wherein the input object is supplied to the selected one of the components of the selected one of the backends systems in accordance with the interaction specification and the connection specification and wherein the one or more output objects receive the transformed input object after processing by the selected one of the components of the selected ones of the backend systems, wherein an instance of the command class is driven by an execute method called by the client, and wherein the instance of the command signals a successful event on no exception being encountered by the selected one of the components of the selected one of the backend systems in processing the input object, and wherein the command signals an unsuccessful event on an exception being encountered by the selected one of the components of the selected one of the backend systems in processing the input object and subnavigators, wherein the execute event for each of the subcommands and subnavigators in the set is triggered by a one of
an internal event in the navigator derived from the execute method for the navigator, or
a successful event from another selected one of the set of subcommands and subnavigators
whereby the successive execution of the subcommands and subnavigators in the set defines an interaction flow with one or more of the backend systems,
wherein the navigator is driven by an execute method and wherein the navigator signals a successful event on no unsuccessful event being signalled by the successive execution of the subcommands and subnavigators in the set, and wherein the navigator signals an unsuccessful event on an unsuccessful event being signalled by any one of the successive executions of the subcommands and subnavigators in the set,
and wherein subcommands have characteristics identical to commands, and wherein subnavigators have characteristics identical to navigators.

11. The software product of claim 10 including computer code for driving a command by an execute method and receiving events from the command signalling the successful or unsuccessful execution of the interaction between the client and the backend system, the execute method comprising the steps of:
factoring a communication from the connection specification and the interaction specification,
connecting the client with the backend system using the factored communication,
sending data of an input object through the factored communication,
receiving data or one or more output objects through the factored communication, and
if no exception occurred, signalling an execution successful event, and otherwise signalling an execution unsuccessful event.

* * * * *